No. 625,669. Patented May 23, 1899.
C. H. GORR.
LAWN MOWING MACHINE.
(Application filed Sept. 26, 1898.)
(No Model.)
Fig. I.
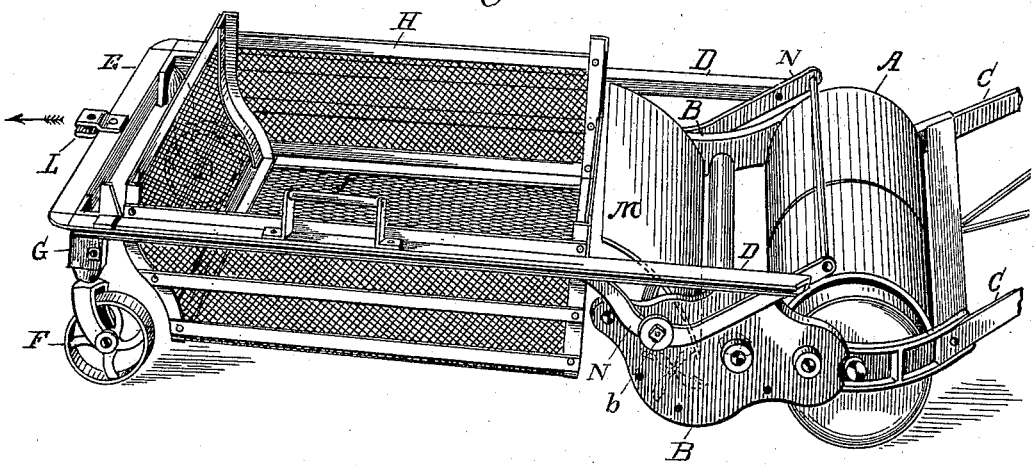
Fig. II.
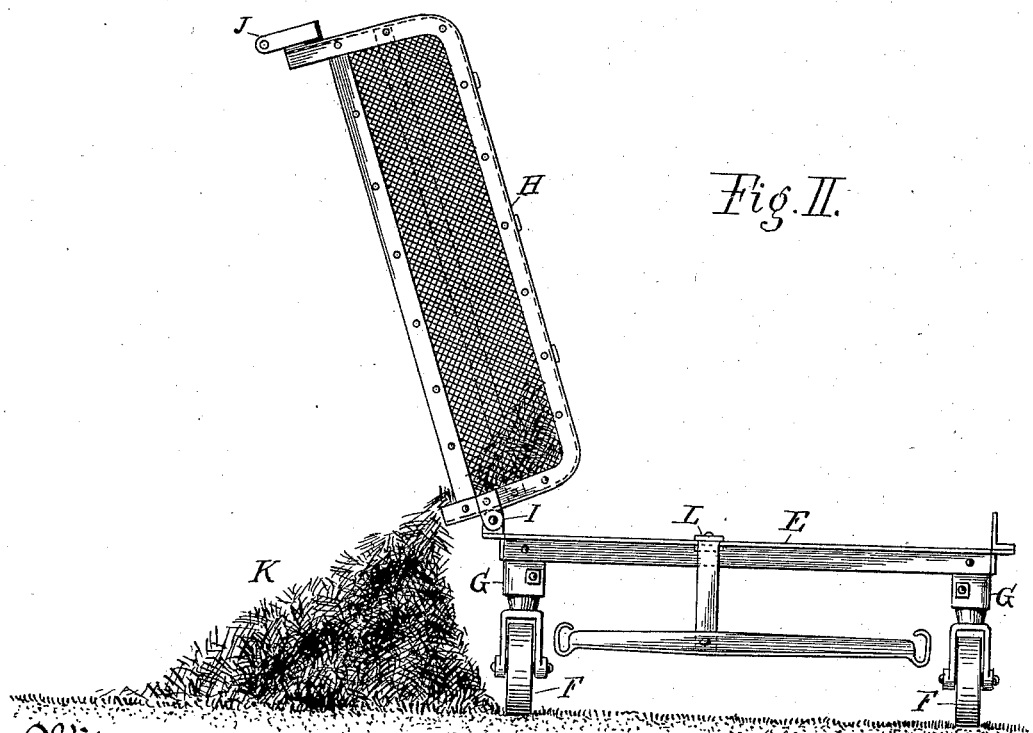
Witnesses.
Inventor.
Charles H. Gorr
By J. Richards & Co.
Attys.

United States Patent Office.

CHARLES H. GORR, OF SAN JOSÉ, CALIFORNIA, ASSIGNOR TO FRANCES E. GORR, OF SAME PLACE.

LAWN-MOWING MACHINE.

SPECIFICATION forming part of Letters Patent No. 625,669, dated May 23, 1899.

Application filed September 26, 1898. Serial No. 691,929. (No model.)

*To all whom it may concern:*

Be it known that I, CHARLES H. GORR, a citizen of the United States, residing at San José, county of Santa Clara, and State of California, have invented certain new and useful Improvements in Lawn-Mowing Machines; and I hereby declare the following to be a full, clear, and exact description of the same, reference being had to the accompanying drawings, forming a part of this specification.

My invention relates to lawn-mowing machines and to certain useful improvements therein.

My improvements consist in constructing lawn-mowing machines with an anterior frame mounted at its front upon swiveling wheels and provided with a receptacle for the grass cut by the machine, this receptacle hinged at the side on the frame and otherwise arranged so as to be decanted and emptied; also consist in a forwardly-curved shield to direct the cut grass into the receptacle before named; also consist in other things of a constructive nature more fully pointed out and explained by aid of the drawings herewith, forming a part of this specification.

The object of my invention is to provide a lawn-mowing machine adapted especially for large areas and for draft by horses or by hand so arranged as to collect, convey, and rapidly decant the mown grass or collected debris and capable of moving in straight lines or curves and of being turned about an axis near the cutting-cylinder. To these ends I construct lawn-mowing machines as shown in the drawings, wherein—

Figure I is an elevation in perspective of a lawn-mowing machine constructed and adapted to operate according to my invention. Fig. II is an end view of the anterior frame and grass-containing receptacle, the latter in the act of being decanted.

The grass-cutting elements of the machine are of ordinary construction, consisting of a rear bearing-roller A, the end members B B, the rearward-extending members C C to form handles or to support a seat for an attendant, and the usual revoluble cutting-cylinder and its accessories, which being well understood and not forming a part of my invention do not require further description.

In front of the mowing-machine and attached to the frame thereof by the extensions D D, I place a frame E of rectangular form, preferably made of metal bars of angular section. This frame E is supported at the rear end by means of the extensions D D of the top members, that are attached to the mowing-machine by being secured to curved members N N, pivoted to members B B at *b*, as shown, and at the front is borne on the swiveling bearing-wheels F, the supports of which are held in the sockets G G in the usual manner of caster-mountings. Within and upon this rectangular frame E, I mount a receptacle H, composed of wire or wicker work, sustained by light framing-bars in the usual manner of constructing such bins or receptacles. This receptacle H has its rear side next the cutter made lower than the other side, as shown in dotted lines in Fig. II, in order to receive the grass deflected by the hood M, and is hinged at one side, or, if required, can have open hinges at each side, so as to be decanted either way, the hinges being attached to the top of the rectangular frame E, as shown at I in Fig. II, and the receptacle is provided with handle or handles J, by means of which an attendant can raise the receptacle and decant the grass K, as shown in the drawings at Fig. II.

The machine is propelled by the usual draft-gearing, connected at L to the frame E, arranged for a horse when the machines are large or for manual operation when the machines are small enough to be so used.

The grass when severed is thrown upward in the usual manner of lawn-mowing machines, but is deflected forward instead of rearward by a curved hood M, adjusted to the required position for discharging the grass, leaves, or debris into the receptacle H.

It will be observed that by placing the receptacle H in front of the mowing-machine and by mounting it on swiveling wheels F, as shown, the machine can be turned in any direction, the axis of revolution being about the center of the bearing-roller A. It will also be seen that if the receptacle were placed behind the mowing-machine the turning strain would have to be transmitted through the latter, and the turning could not be easily performed on account of the adhesion or traction of the supporting-roller A; but by placing the receptacle as shown the working draft will turn the machine in its course without strain upon the mowing-machine and independent of the adhesion of the supporting-roller A.

I am aware that lawn-mowing machines arranged with collecting-receptacles for grass that are trailed or mounted behind the mowing-machines are well known and I do not claim such receptacles as my invention; but I do claim and desire to secure by Letters Patent—

1. In a lawn-mower, the combination of rear bearing-roller A, end members B B, and handles C C, with rectangular U-shaped frame E, carried horizontally at a high plane by means of swiveled bearing-wheels F F at front, and extensions D D at rear, the latter secured to curved members N N pivoted on members B B, and reticulated receptacle H hinged to said frame E at one side thereof, substantially as specified.

2. In a lawn-mower, the combination of rear bearing-roller A, end members B B, handles C C, and curved hood M, with U-shaped frame E, supported in front by swiveled bearing-rollers F F, and at rear by means of extensions D D secured to curved members N N pivoted on members B B, and reticulated receptacle H hinged to said frame E at one side thereof, substantially as specified.

CHARLES H. GORR.

Witnesses:
H. W. BROWN,
H. SANDERSON.